US010826999B2

(12) United States Patent
Hu et al.

(10) Patent No.: US 10,826,999 B2
(45) Date of Patent: Nov. 3, 2020

(54) FACILITATION OF SESSION STATE DATA MANAGEMENT

(71) Applicant: AT&T Intellectual Property I, L.P., Atlanta, GA (US)

(72) Inventors: Qingmin Hu, Sammamish, WA (US); Brian Kevin Daly, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 230 days.

(21) Appl. No.: 15/192,597

(22) Filed: Jun. 24, 2016

(65) Prior Publication Data
US 2017/0374157 A1 Dec. 28, 2017

(51) Int. Cl.
*H04L 29/08* (2006.01)
*H04W 4/02* (2018.01)
*H04L 12/24* (2006.01)
*H04W 4/029* (2018.01)

(52) U.S. Cl.
CPC ........ *H04L 67/142* (2013.01); *H04L 41/0816* (2013.01); *H04L 67/18* (2013.01); *H04W 4/02* (2013.01); *H04W 4/029* (2018.02)

(58) Field of Classification Search
CPC ....... H04L 45/02; H04L 45/38; H04L 43/065; H04L 41/0803; H04L 43/0876; H04L 47/22; H04L 41/0823; H04L 41/12; H04L 47/20; H04L 47/2441; H04L 41/0896; H04L 47/14; H04L 41/5054; H04L 47/805; H04L 47/822; H04L 63/102; H04L 65/4076; H04L 67/1002; H04L 67/303; H04L 69/24; H04L 67/104; H04L 67/14; H04W 88/16; H04W 72/04; H04W 72/048; H04W 4/60; H04W 40/24; G06F 15/16
USPC ....... 709/220, 239, 226, 245, 204, 217, 219, 709/223, 224, 225, 229; 370/230, 235, 370/254
See application file for complete search history.

(56) References Cited

U.S. PATENT DOCUMENTS

| | | | |
|---|---|---|---|
| 7,219,153 B1 * | 5/2007 | Day | H04L 29/06027 707/999.01 |
| 9,819,540 B1 * | 11/2017 | Bahadur | H04L 41/0813 |
| 2004/0073596 A1 * | 4/2004 | Kloninger | H04L 29/06 709/200 |
| 2006/0274650 A1 * | 12/2006 | Tyagi | H04L 47/70 370/229 |

(Continued)

FOREIGN PATENT DOCUMENTS

| | | | | |
|---|---|---|---|---|
| EP | 2442596 A1 | 4/2012 | | |
| EP | 2838231 A1 * | 2/2015 | ........... | H04L 12/851 |

*Primary Examiner* — Tonia L Dollinger
*Assistant Examiner* — Linh T. Nguyen
(74) *Attorney, Agent, or Firm* — Amin, Turocy & Watson, LLP

(57) ABSTRACT

A more efficient wireless network can utilize network elements, a service controller, and agents associated with the network elements. Each network element can publish state information and resource information so that other network elements and the service controller can readily identify which network element has available resources. Therefore, each network element can be a resource consumer and a resource provider. Additionally, the network elements can register with the service controller and/or allow agents to act on their behalf in order to generate a more efficient network.

20 Claims, 12 Drawing Sheets

(56) References Cited

U.S. PATENT DOCUMENTS

| | | | |
|---|---|---|---|
| 2011/0219134 A1* | 9/2011 | Lidstrom | G06F 15/16 709/229 |
| 2012/0066292 A1 | 3/2012 | Yu et al. | |
| 2013/0166718 A1* | 6/2013 | Okuyama | H04L 67/24 709/223 |
| 2015/0250009 A1 | 9/2015 | Kahn et al. | |
| 2015/0334043 A1* | 11/2015 | Li | H04L 47/783 709/213 |
| 2015/0381515 A1* | 12/2015 | Mattson | H04L 41/145 707/609 |
| 2016/0028620 A1* | 1/2016 | Hari | H04L 45/38 370/389 |
| 2016/0029251 A1 | 1/2016 | Kahn et al. | |
| 2016/0037571 A1 | 2/2016 | Hossain et al. | |
| 2016/0062746 A1* | 3/2016 | Chiosi | G06F 8/35 717/104 |
| 2016/0095032 A1 | 3/2016 | Varney | |
| 2016/0100330 A1 | 4/2016 | Broustis et al. | |
| 2016/0127958 A1 | 5/2016 | Viswanathan et al. | |
| 2016/0127975 A1 | 5/2016 | Hu et al. | |
| 2016/0149770 A1* | 5/2016 | Sampath et al. | H04L 12/26 370/250 |
| 2016/0330076 A1* | 11/2016 | Tiwari | H04L 41/0806 |
| 2016/0374095 A1* | 12/2016 | Jeon | H04L 41/04 |
| 2017/0026244 A1* | 1/2017 | Kamath | H04L 41/12 |
| 2017/0094582 A1* | 3/2017 | Ueda | H04W 40/24 |
| 2017/0163493 A1* | 6/2017 | AuYoung | H04L 41/30 |
| 2017/0286644 A1* | 10/2017 | Dong | G06F 21/60 |
| 2017/0295606 A1* | 10/2017 | Kahn | H04W 76/026 |
| 2017/0374157 A1* | 12/2017 | Daly | H04L 67/142 |

\* cited by examiner

FACILITATION OF SESSION STATE DATA MANAGEMENT

TECHNICAL FIELD

This disclosure relates generally to facilitating management of session state data. More specifically, this disclosure relates to managing session state resources.

BACKGROUND

A session is a semi-permanent interactive information interchange, also known as a dialogue, a conversation or a meeting, between two or more communicating devices, or between a computer and user. A session is set up or established at a certain point in time, and then torn down at some later point. An established communication session may involve more than one message in each direction. A session is typically, but not always, stateful, meaning that at least one of the communicating parts needs to save information about the session history in order to be able to communicate, as opposed to stateless communication, where the communication consists of independent requests with responses. The state of a digital logic circuit or computer program is a technical term for all the stored information, at a given instant in time, to which the circuit or program has access. The output of a digital circuit or computer program at any time is completely determined by its current inputs and its state.

In situations where multiple web servers must share knowledge of session state (as is typical in a cluster environment) session information must be shared between the cluster nodes that are running web server software. Methods for sharing session state between nodes in a cluster include: multicasting session information to member nodes, sharing session information with a partner node using distributed shared memory or memory virtualization, sharing session information between nodes using network sockets, storing session information on a shared file system such as a distributed file system or a global file system, or storing the session information outside the cluster in a database. An established session is thus used to perform a connection-oriented communication. A session also is used to transmit in connectionless communication modes.

The above-described background relating to a session state management is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
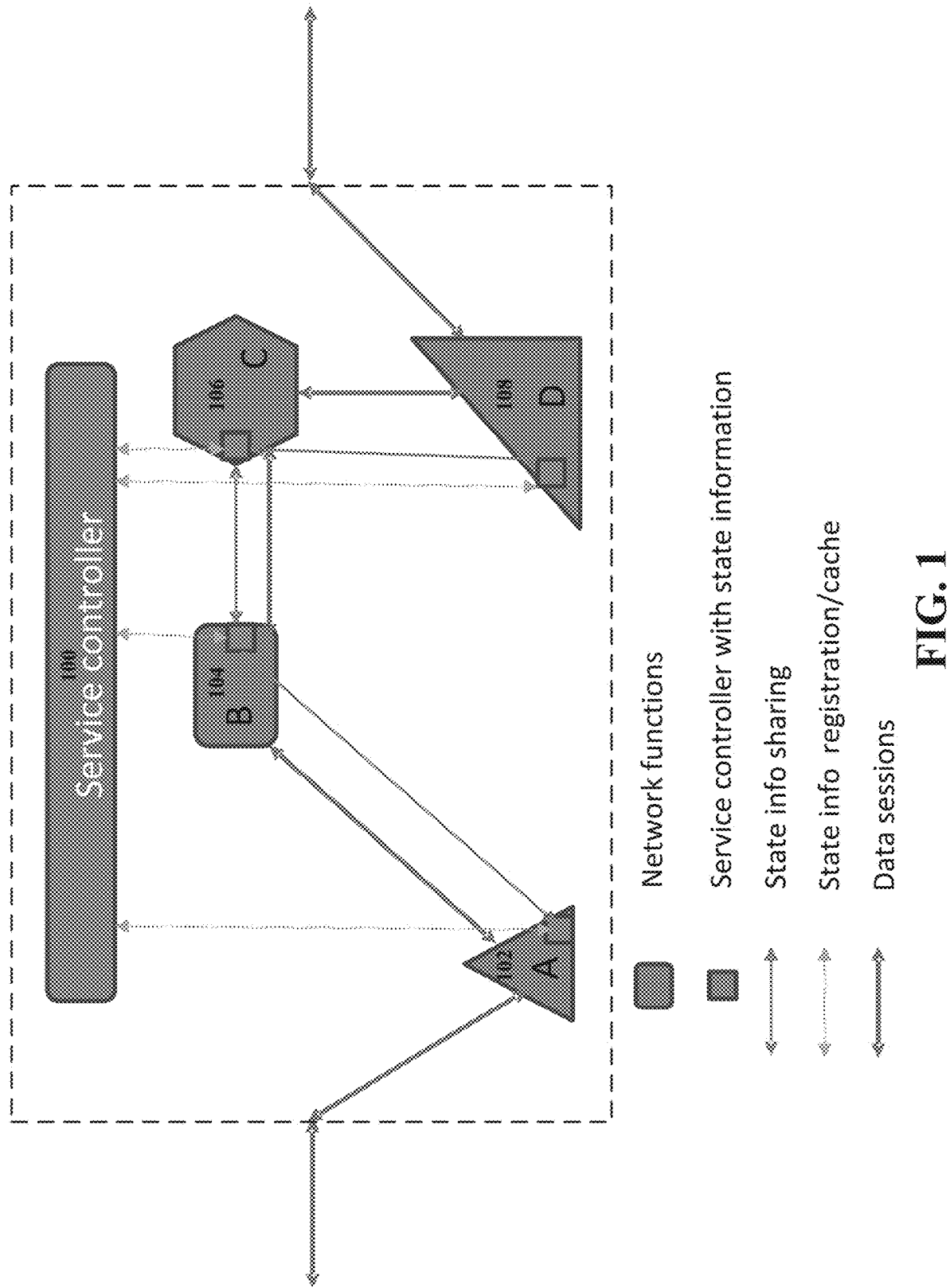
FIG. 1 illustrates an example wireless network comprising a state management framework according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate state session management.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to next generation mobile networks, such as 5th generation, Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate session state management. Facilitating session state management can be implemented in connection with any type of device with a connection to the communications network such as: a mobile handset, a computer, a handheld device, or the like.

With the advance of software-defined network (SDN) and network function virtualization NFV technologies, mobility networks will undergo dramatic changes in terms of function architecture. SDN is an approach to computer networking that allows network administrators to manage network services through abstraction of higher-level functionality. This is done by decoupling the system that makes decisions about where traffic is sent (the control plane) from the underlying systems that forward traffic to the selected destination. NFV is a network architecture concept that uses the technologies of IT virtualization to virtualize entire classes of network node functions into building blocks that may connect, or chain together, to create communication services. An NFV can comprise one or more virtual machines running different software and processes, on top of standard high-volume servers, switches and storage, or even cloud computing infrastructure, instead of having custom hardware appliances for each network function.

One of the important aspects for mobility network is session state information management. A new approach to session state management is to leverage resource-based network technology to be implemented as part of a 5G network. In computer networking, a session can be a semi-permanent interactive information interchange, also known as a dialogue, a conversation, or a meeting, between two or more communicating devices, or between a computer and user. A session can also be set up or established at a certain point in time, and then torn down at some later point. An established communication session can involve more than one message in each direction. A session is typically, but not always, stateful, meaning that at least one of the communicating parts needs to save information about the session and its history in order to be able to communicate, as opposed to stateless communication, where the communication comprises independent requests with responses. The state of a digital logic circuit or computer program is a technical term for all the stored information, at a given instant in time, to which the circuit or program has access. The output of a digital circuit or computer program at any time can be determined by its current inputs and its state.

4G/LTE mobile core network can be connection and session oriented with session-related information such as international mobile station equipment identity (IMEI), mobile station international subscriber directory number (MSISDN), error code, internet protocol (IP) addresses, etc. imbedded in the data flow. Some of this information will have to traverse the core network to get to the entity that needs them. For example, some error codes generated in a mobility management entity (MME) will have to pass through serving gateway protocols (SGW), packet data network gateway protocols (PGW), policy and charging rules function (PCRF), then, on to application entities such as a proxy call session control functions (P-CSCF) for call control. The aforementioned process is very inefficient, complex, and increases costs.

In order to support the next generation of mobile services dynamically and efficiently, the next generation mobility core network system can manage contextual information and make the information dynamic and easily accessible. This can be accomplished by having most of the network and service functions in the network built and addressed as resources that can be represented using a common information model and be accessed using interfaces to allow various vendor components to seamlessly communicate with the system. A network function can be a functional network element, in a network, comprising a set of defined behaviors and interfaces.

This disclosure outlines a framework of a functional modular infrastructure where network and mobility service functions can be represented as addressable resources, which can be accessed and consumed. Each of the network functions can choose to publish their state information as resources. The state of a digital logic circuit or computer program is a technical term for all the stored information, at a given instant in time, to which the circuit or program has access. The output of a digital circuit or computer program at any time is determined by its current inputs and its state. Each of the functions can also subscribe to any available state information, of other network functions, depending on their needs. This framework can have a resource registration or caching function as part of a service controller so that any network functions can determine whether the state information is available for other network functions.

These functions can be defined and realized as software modules using standard NFV and connected with SDN and other interfaces. A state management agent can manage each state associated with a network function and can communicate with the service controller. The state management agent can be a provider and consumer of state information on behalf of the network function, and it can free the network function of state management responsibilities. Furthermore, the service controller can be implemented as an add-on to an SDN controller for information registration, which can be a repository for the state information or an index comprising pointers to such information. A message to the service controller can comprise information such as, an agent identification (ID) of the network function, description of the state information, the type of the data (such as a container), time-to-live (TTL) value, and/or other parameters.

Resource-oriented network functions can provide services such that information can be located at one network element and accessed by any other network element, users, and/or devices at any time. Control of access to the recourses can be regulated by policy-enabled security mechanisms based on operator or user policies. Policies can include, but are not limited to: access, time, updates, content modifications, etc. The policies can be implemented by the network elements, agents of the network elements, and/or the service controller. For instance, to preserve bandwidth of a network element, an agent associated with the network element, can prevent another network element and/or the service controller from accessing resources associated with the network element. Content modification privileges can be specific to the service controller or the agent. For instance, although an agent may be allowed to modify content/resources of its associated network element, the service controller may not be able to modify the content/resources of that specific network element and vice versa. Modification of resources can comprise creating, deleting, updating, and/or flagging the resources. Flagging of the content/resource can be associated with an indication that the content/resource might be better received from another network element, as opposed to the current network element, based on a current state or a predicted future state.

The agent can also prevent, redirect, and/or negotiate communication and resources between the service controller and a network element or between a first network element and a second network element. For example an agent associated with a first network element can receive a request from the service controller for a resource associated with the first network element. However, based upon a bandwidth analysis of the first network element and a second network element, the agent can return a message to the service controller indicating that the resource should be obtained from the second network element. This will allow the service controller to determine if it would like to procure the resource from the second network element. Alternatively, the agent can request the resource from the second network element, in response to an indication that the first network element does not have the bandwidth to provide the resource at an appropriate quality of service (QOS), and forward the resource to the service controller. This can expedite resource distribution because it eliminates at least one additional message to the service controller. This can be due to the service controller providing default rights to the agent for the agent to act on its behalf when the QOS may be lacking. Conversely, the agent can relinquish rights to the service controller and/or the network element to facilitate a more efficient network. It should be noted that an agent can service either one network element or multiple network elements and/or one service controller or multiple service controllers.

In certain situations, the service controller can override an action by an agent and/or not accept a proposed measure of action from the agent. Referring to the aforementioned example where the agent suggest that the resource comes from the second network element, depending upon how the system is set up and which component has complete autonomy, the service controller could choose not to accept the resource from the second network element and only accept the resource from the first network element. The agent and/or the service controller can also request that a specific resource is updated by its host network element. Thus, the network element can update its state information and resources based on a QOS or a priority associated with the network element and/or its resources.

A common information model can be used to help facilitate communications and interpret state information. For instance, if a network element does not understand a request from the service controller, then the service controller can use a common information model to help the network element to interpret the request. Additionally, if the service controller does not understand a resource or any other data from an agent or a network element, the service controller can use the common information model to help interpret what it does not understand. The common information model can also be updated accordingly as the network itself changes.

Each network function can choose to publish its state information including, but not limited to, current location, possible error codes, usage information, session related information, IP addresses, MSISDN, uplink (UL)/downlink (DL) rules, etc. The available state information can be registered with the service controller and the service controller can have/generate policies regarding access to the resources. Each network function can then acts as both a provider and a consumer of the state information as needed.

It should also be noted that an artificial intelligence (AI) component can facilitate automating one or more features in accordance with the disclosed aspects. A memory and a processor as well as other components can include functionality with regard to the figures. The disclosed aspects in connection with session state management can employ various AI-based schemes for carrying out various aspects thereof. For example, a process for detecting one or more trigger events, modifying a resource, and so forth, can be facilitated with an example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed. In the case of communication systems, for example, attributes can be a frequency band and a technology and the classes can be a resource value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to resource management, resource registration, and policy generation. The criteria can include, but is not limited to, predefined values, frequency attenuation tables or other parameters, service provider preferences and/or policies, and so on.

In one embodiment, described herein is a method comprising receiving state data related to a state of a first functional network element, and registering the state data resulting in registration of the first functional network element. In response to the registering, the method can generate, policy data associated with a policy related to access of a resource of the first functional network element. Additionally, in response to a request for the resource by a second functional network element, the method comprises sending the state data to the second functional network element in accordance with the policy.

According to another embodiment, a system can facilitate, the sending subscription request data related to a first request to subscribe to first state data associated with a first functional network element; and in response to the sending the subscription request data, receiving an update related to a change of the first state data. In response to the receiving, the system can send request data related to a second request for the first resource of the first functional network element; and in response to sending the request data, the system can receive the first resource.

According to yet another embodiment, described herein is a machine-readable storage medium that can perform the operations comprising registering a functional network element with a service controller, wherein the registering comprises sending, to the service controller, state data associated with a state of the functional network element. The registration process also comprises sending, to the service controller, agent identification data related to a state management agent and sending, to the service controller, description data associated with a description of the state of the functional network element. Consequently, in response to the registering, the machine-readable storage medium can receive an indication that the functional network element has been determined to have been registered with the service controller.

These and other embodiments or implementations are described in more detail below with reference to the drawings.

Referring now to FIG. 1, illustrated is an example wireless network comprising a state management framework according to one or more embodiments. The state management framework can comprise functional network elements 102, 104, 106, 108 and a service controller 100. The network elements 102, 104, 106, 108 can facilitate data sessions between each other and share resources that can be requested by other network elements or the service controller 100. State information associated with each network element 102, 104, 106, 108 can also be shared amongst the network elements 102, 104, 106, 108. For instance, network element 102 can share its state information with network element 104 and vice versa; network element 104 can share its state information with network element 106 and vice versa; and network element 106 can share its state information with network element 108 and vice versa.

The network elements 102, 104, 106, 108 can also register with the service controller 100. Registering with the service controller 100 allows the service controller 100 to know the state of each network element 102, 104, 106, 108 and its resources. For example, upon registration of network function 102 with the service controller 100, the service controller can know that the network element 102 is in a data session with the network element 104 and so on. Based on this knowledge, the service controller 100 can request resources from each of the network elements 102, 104, 106, 108 as needed.

Figure 2:
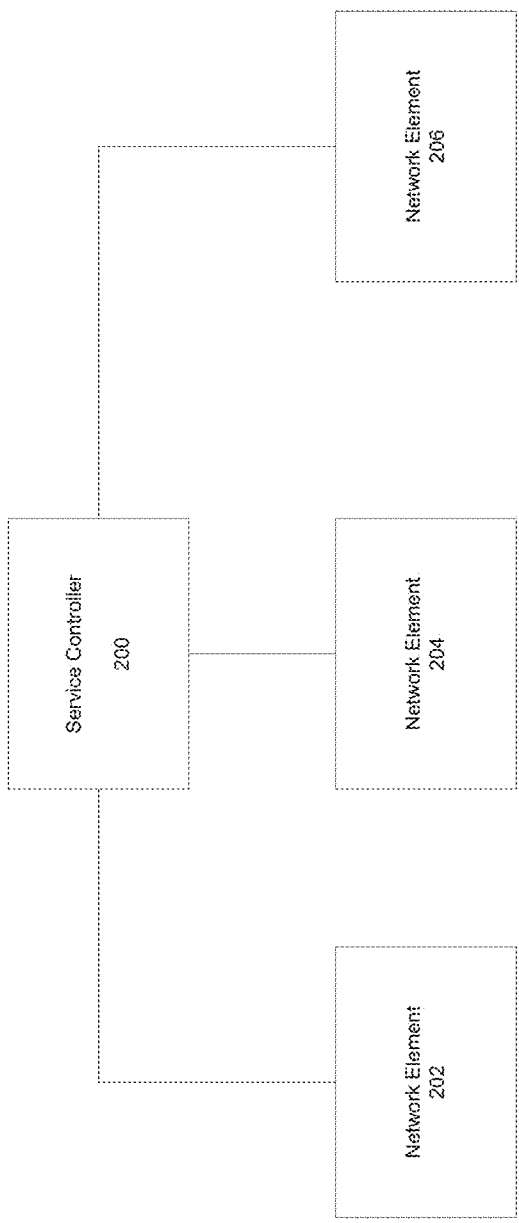
FIG. 2 illustrates an example wireless network comprising a state management framework wherein a service controller communicates directly with network elements according to one or more embodiments.

Referring now to FIG. 2, illustrated is an example wireless network comprising a state management framework wherein a service controller communicates directly with network elements according to one or more embodiments. A service controller 200 can communicate directly with each network element 202, 204, 206 as opposed to an agent associated with the network elements 202, 204, 206 communicating with the service controller 200. Therefore each of the network elements 202, 204, 206 can communicate their state status, resources, and data sessions directly to the service controller 200. Direct communication between the network elements 202, 204, 206 and the service controller can tie up resources and/or bandwidth associated with the network elements 202, 204, 206. Consequently, an agent can be used to free up some of the resources and/or bandwidth of the network elements 202, 204, 206.

Figure 3:
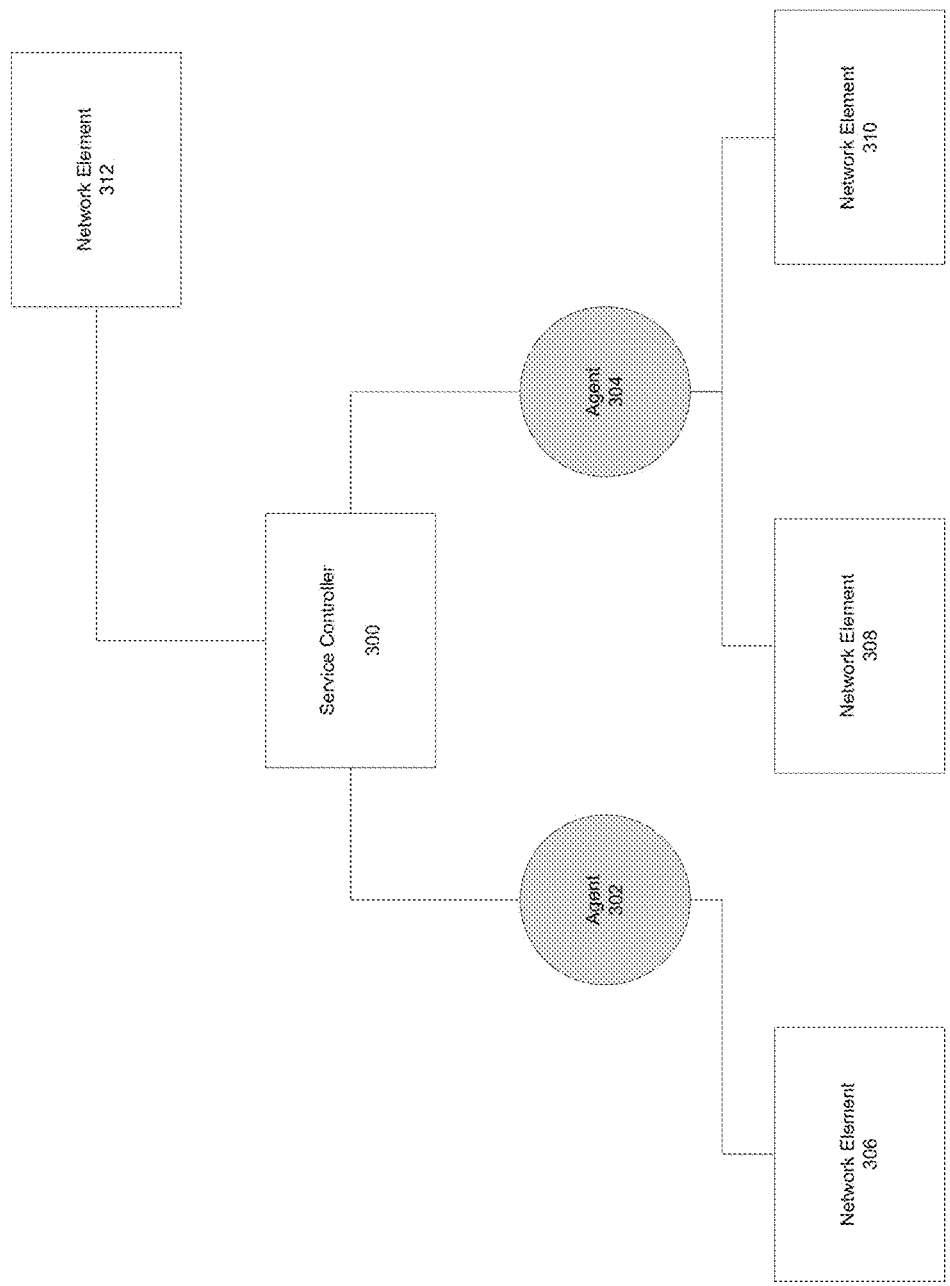
FIG. 3 illustrates an example wireless network comprising a state management framework wherein state management can be facilitated by agents associated with network elements according to one or more embodiments.

Referring now to FIG. 3, illustrated is an example wireless network comprising a state management framework wherein state management can be facilitated by agents associated with network elements according to one or more embodiments. The state management framework illustrated in FIG. 3 shows several examples of how communication between the service controller 300 and the network elements 306, 308, 310, 312 can take place. The network element 312 can communicate directly with the service controller 300. However, the network elements 306, 308, 310 can rely on agents 302, 304 to facilitate communication between the service controller 300 and the network elements 306, 308, 310, 312. For example, the network work element 306 can directly rely on the agent 302 to communicate with the service controller 300. The agent can mitigate resources of the network element 306 from being tied up by the service controller 300. The agent can also negotiate, comply with, or reject requests from the service controller. The agent 302 can register the network element 306 with the service controller 300 and publish state information associated with the network element.

In another embodiment, the agent 304 can be shared by the network elements 308, 310. In this architecture, the agent 304 can register the network elements 308, 310 with the service controller 300. Furthermore, the agent 304 can negotiate resources between the service controller 300 and the network elements 308, 310. For instance, a request for a specific resource associated with the network element 308 can be received by the agent 304. However, the agent 304 can realize that the network element 310 is better equipped to disseminate the requested resource and/or a resource of similar characteristics. Consequently, the agent 304 can send this data to the service controller 300 and allow the service controller to make the final decision on which network element 308, 310 the resource should come from. Conversely, if the agent 304 is provided with the ability to make the decision as to which network element 308, 310 the resource should come from, the agent 304 can just facilitate sending of the resource from the network element 310.

Figure 4:
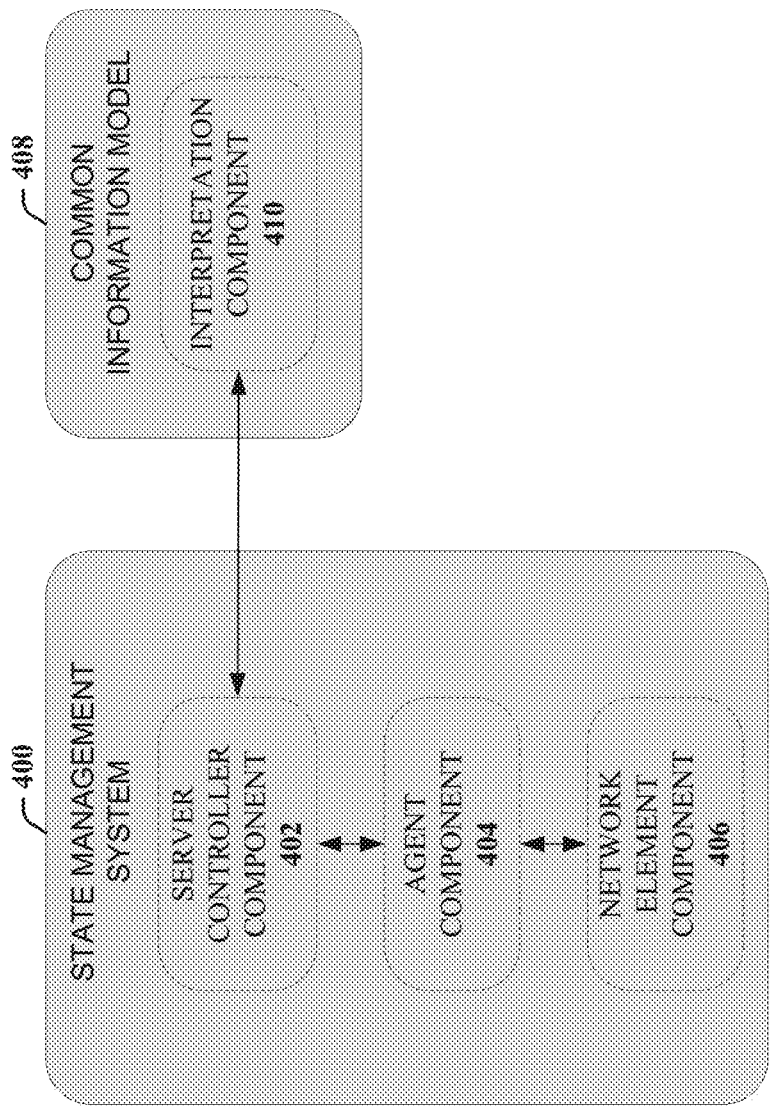
FIG. 4 illustrates an example wireless network comprising a state management framework in conjunction with a common information model according to one or more embodiments.

Referring now to FIG. 4, illustrated is an example wireless network comprising a state management framework in conjunction with a common information model according to one or more embodiments. A state management system 400 can comprise several components including, but not limited to: a service controller component 402, an agent component 404, a network element component 406, etc. Network elements within the network element component 406 can publish their resources and register with the service controller component 402 or the network elements can leverage the agent component 404 to facilitate registration and publishing state information with the service controller component 402. The network elements can also share resources amongst themselves in conjunction with data sessions.

A common information model 408 can comprise an interpretation component 410, which can be used to help interpret state information. For instance, if a network element within the network element component 406 does not understand a request from the service controller component 402, then the service controller component 402 can use the common information model 408 to help the network element to interpret the request. Additionally, if the service controller component 402 does not understand a resource or any other data from the agent component 404 or the network element component 406, the service controller component 402 can use the common information model 408 to help interpret what it does not understand.

Figure 5:
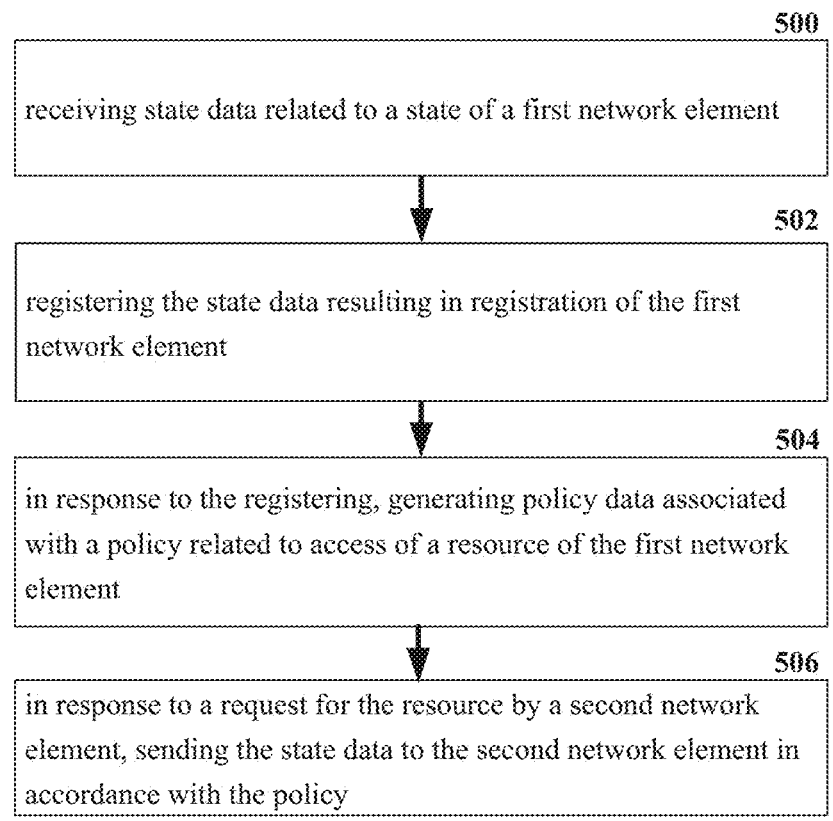
FIG. 5 illustrates an example schematic system block diagram of a service controller functionality according to one or more embodiments.

Referring now to FIG. 5, illustrated is an example schematic system block diagram of a service controller functionality according to one or more embodiments. At element 500, state data related to a state of a first network element can be received. The state data associated with network elements can be received by a service controller as a part of a registration process. The state data can be received from the network element itself and/or an agent associated with the network element. At element 502, the state data can be registered, resulting in registration of the first network element. The service controller can generate policy data and share it with the agent and/or the network element. In response to the registering, policy data associated with a policy related to access of a resource of the first network element can be generated at element 504; and in response to a request for the resource by a second network element, the state data can be sent to the second network element in accordance with the policy at element 506.

Figure 6:
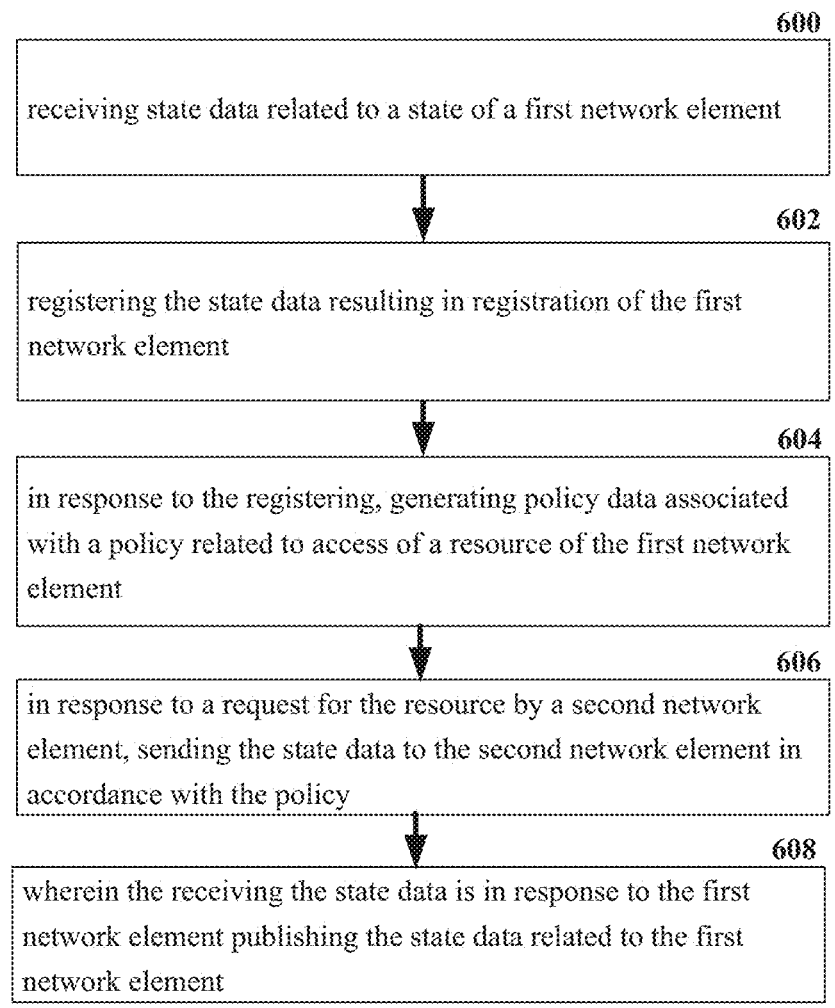
FIG. 6 illustrates an example schematic system block diagram of a service controller functionality in response to published data from a network element according to one or more embodiments.

Referring now to FIG. 6, illustrated is an example schematic system block diagram of a service controller functionality in response to published data from a network element according to one or more embodiments. At element 600, state data related to a state of a first network element can be received. The state data associated with network elements can be received by a service controller as a part of a registration process. The state data can be received from the network element itself and/or an agent associated with the network element. At element 602, the state data can be registered, resulting in registration of the first network element. The service controller can generate policy data and share it with the agent and/or the network element. In response to the registering, policy data associated with a policy related to access of a resource of the first network element can be generated at element 604; and in response to a request for the resource by a second network element, the state data can be sent to the second network element in accordance with the policy at element 606. Each network element can publish its state data and resources so that the service controller and other network elements can have access to the state data and resources. At element 608, the receiving the state data is in response to the first network element publishing the state data related to the first network element.

Figure 7:
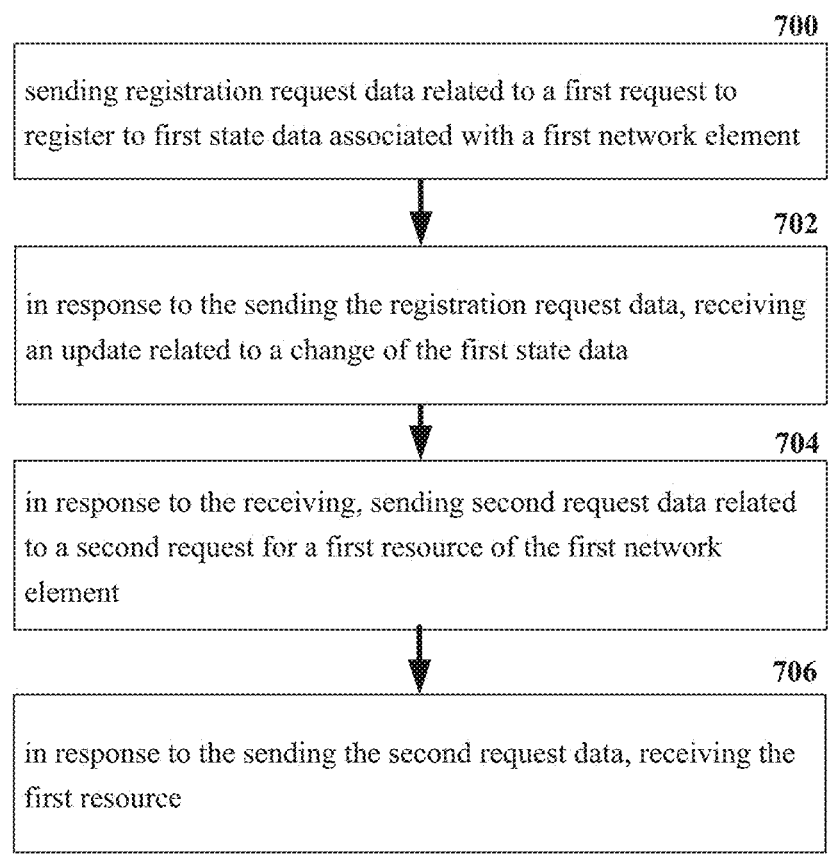
FIG. 7 illustrates an example schematic system block diagram for a network element registration request and resource request process according to one or more embodiments.

Referring now to FIG. 7, illustrated is an example schematic system block diagram for a network element subscription request and resource request process according to one or more embodiments. At element 700, registration request data related to a first request to register to first state data associated with a first network element can be sent. Network elements can request to subscribe to, or register with, other network elements via a service controller. in response to the sending the registration request data, an update related to a change of the first state data can be received at element 702. Since state data can vary and change over time as each network element performs certain functions, updates alerting the service controller and/or other network elements can increase efficiency of the system. Requests for resources can also be updated to reflect any new state data, resources, or system modifications so that the requests are up-to-date and correspond with the most recent updates to the resources. In response to the receiving, second request data related to a second request for a first resource of the first network element can be received at element 704; and in response to the sending the second request data, the first resource can be received at element 706.

Figure 8:
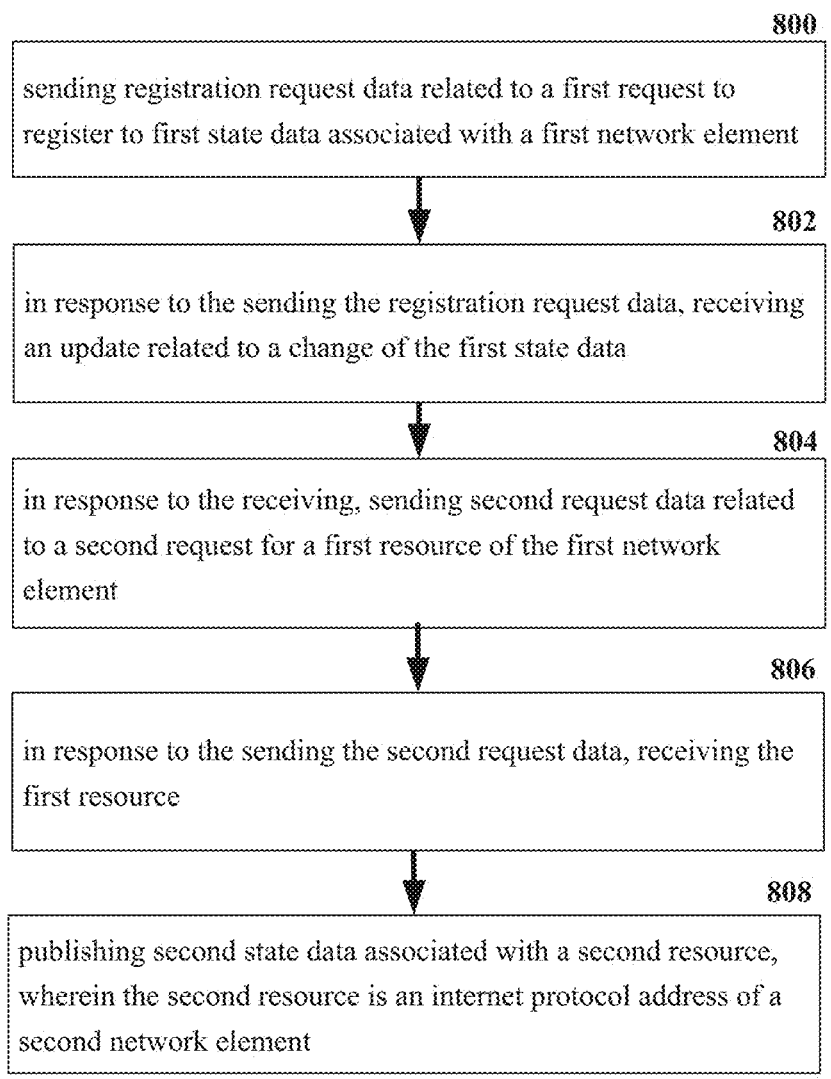
FIG. 8 illustrates an example schematic system block diagram for a network element subscription request and resource request process comprising publishing state data according to one or more embodiments.

Referring now to FIG. 8, illustrated is an example schematic system block diagram for a network element subscription request and resource request process comprising publishing state data according to one or more embodiments. At element 800, registration request data related to a first request to register to first state data associated with a first network element can be sent. Network elements can request to subscribe to, or register with, other network elements via a service controller. in response to the sending the registration request data, an update related to a change of the first state data can be received at element 802. Since state data can vary and change over time as each network element performs certain functions, updates alerting the service controller and/or other network elements can increase efficiency of the system. Requests for resources can also be updated to reflect any new state data, resources, or system modifications so that the requests are up-to-date and correspond with the most recent updates to the resources. In response to the receiving, second request data related to a second request for a first resource of the first network element can be received at element 804; and in response to the sending the second request data, the first resource can be received at element 806. To ensure that other network elements and the service controller are kept abreast of any modifications or updates to resources, at element 808, a network element can publish second state data associated with a second resource, wherein the second resource is an internet protocol address of a second network element.

Figure 9:
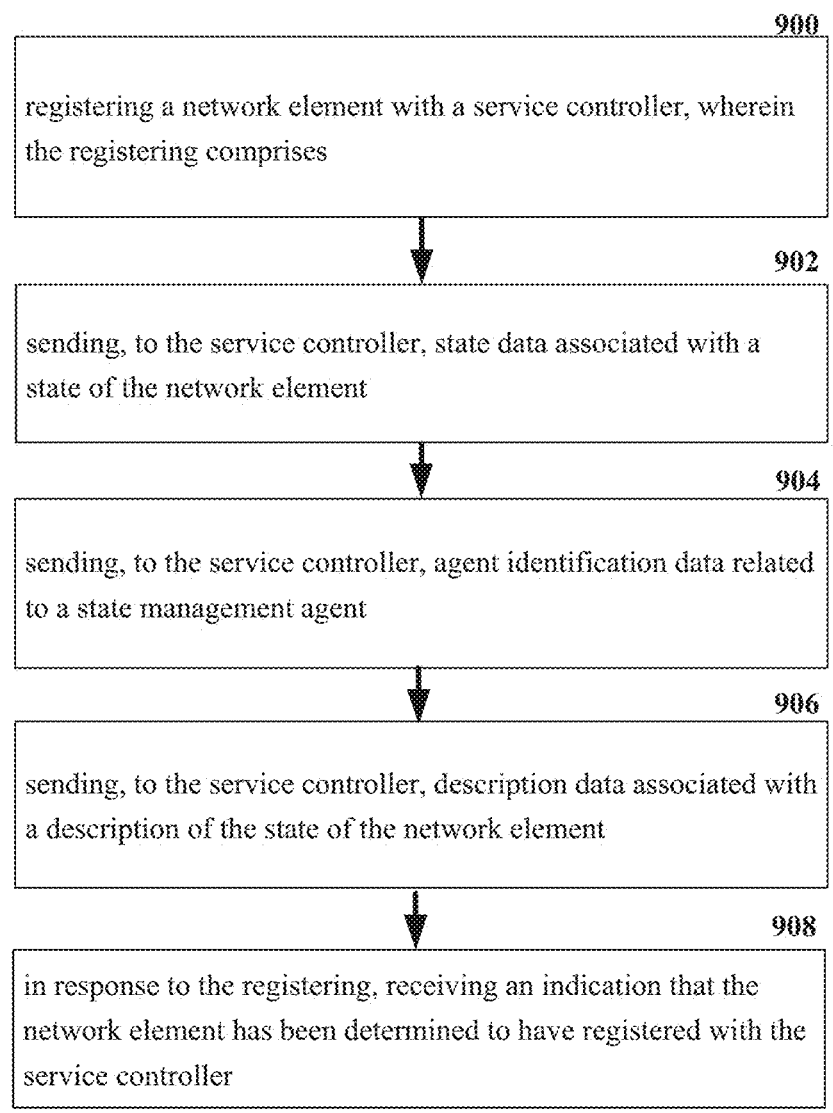
FIG. 9 illustrates an example schematic system block diagram for registering a network element with a service controller according to one or more embodiments.

Referring now to FIG. 9, illustrated is an example schematic system block diagram for registering a network element offering state information with a service controller according to one or more embodiments. At element 900, a network element can be registered with a service controller, wherein the registering comprises sending, at element 902, to the service controller, state data associated with a state of the network element. The state data can either be sent by the network element itself or an agent associated with the network element. At element 904, agent identification data related to a state management agent can be sent to the service controller; and at element 906, description data associated with a description of the state of the network element can be sent to the service controller. The service controller can send a notification back to the network element or the agent comprising data, which indicates that the network agent is registered with the service controller. Thus, in response to the registering, an indication that the network element has been determined to have registered with the service controller can be received at element 908.

Figure 10:
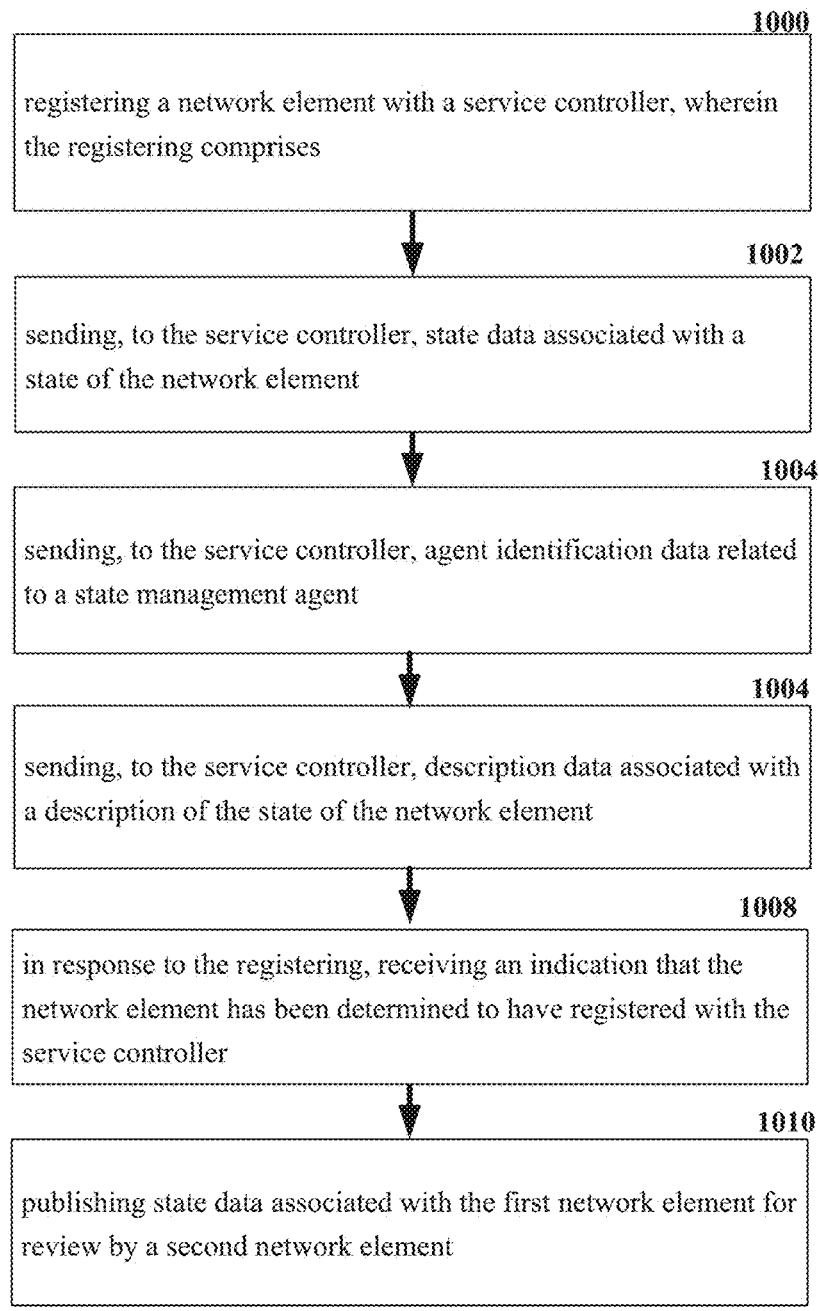
FIG. 10 illustrates an example schematic system block diagram for registering a network element with a service controller and publishing state data for review by another network element according to one or more embodiments.

Referring now to FIG. 10, illustrated is an example schematic system block diagram for registering a network element with a service controller and publishing state data for review by another network element according to one or more embodiments. At element 1000, a network element can be registered with a service controller, wherein the registering comprises sending, at element 1002, to the service controller, state data associated with a state of the network element. The state data can either be sent by the network element itself or an agent associated with the network element. At element 1004, agent identification data related to a state management agent can be sent to the service controller; and at element 1006, description data associated with a description of the state of the network element can be sent to the service controller. The service controller can send a notification back to the network element or the agent comprising data, which indicates that the network agent is registered with the service controller. Thus, in response to the registering, an indication that the network element has been determined to have registered with the service controller can be received at element 1008. To generate efficiencies within the state management architecture, state data associated with the first network element can be published for review by a second network element at element 1010.

Figure 11:
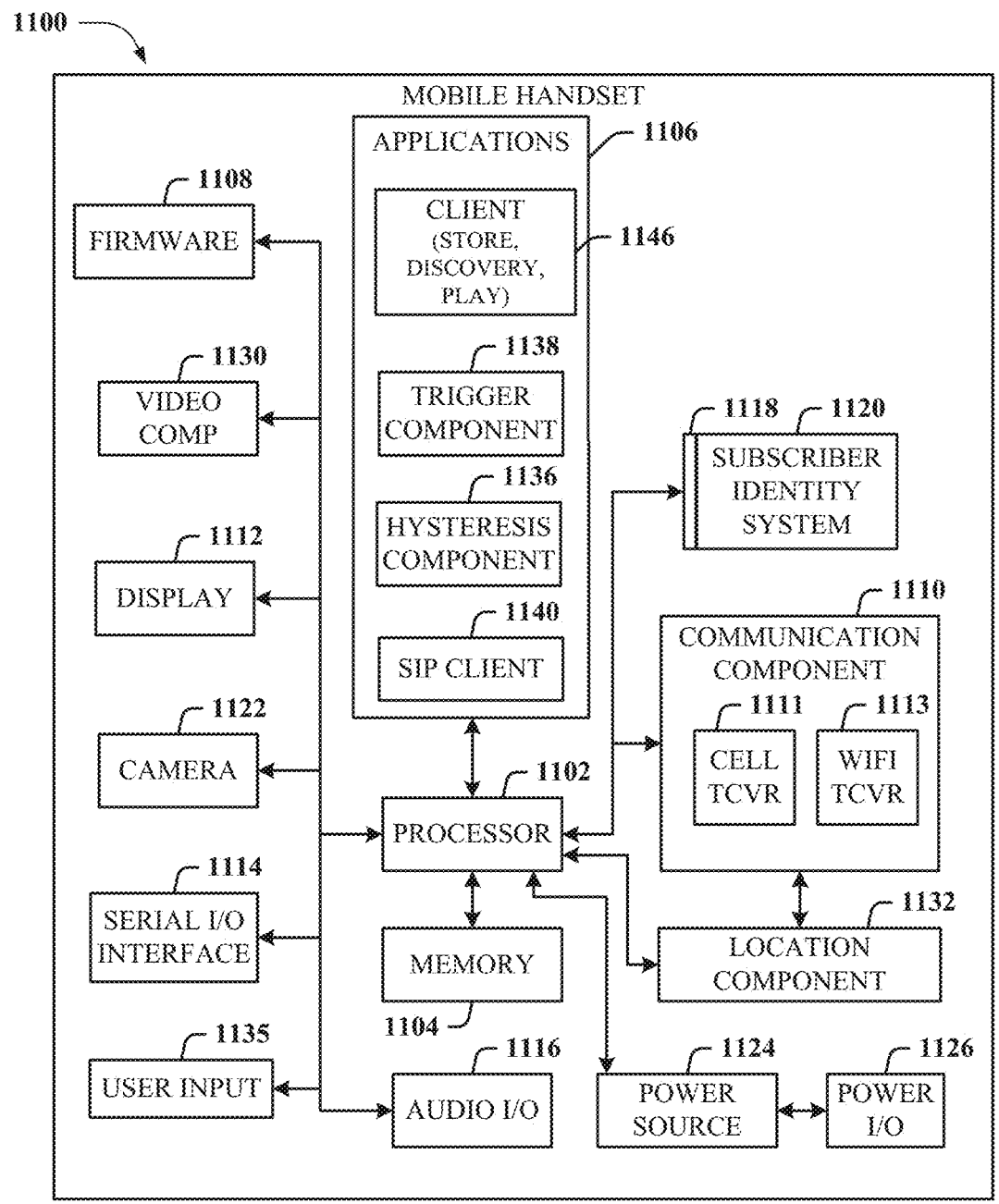
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
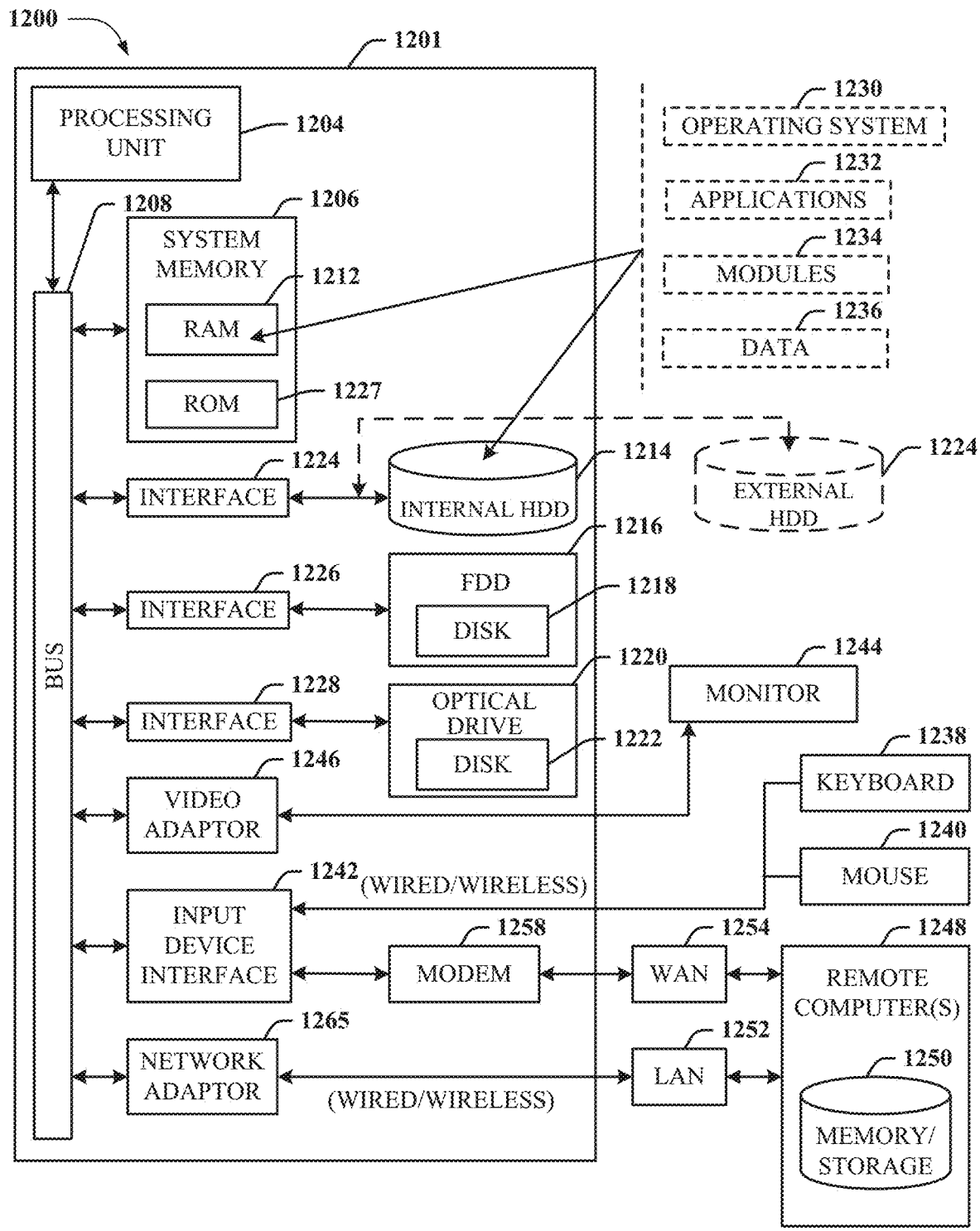
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
  receiving, by network equipment comprising a processor, state data related to a state of a first network element;
  registering, by the network equipment, the state data resulting in registration of the first network element;
  in response to the registering, generating, by the network equipment, policy data associated with a policy related to access of a resource of the first network element;
  in response to a first request for the resource by a second network element, sending, by the network equipment, the state data to the second network element in accordance with the policy;
  based on the policy data, flagging, by the network equipment, the resource, wherein the flagging comprises generating an indication that the resource is to be received from a third network element based on a predicted state of the first network element, and wherein being permitted to perform the flagging of the resource is a content modification privilege that is specific to the network equipment; and in response to a second request for the resource by the third network element:
   preventing, by the network equipment, access to the state data by the third network element to preserve a bandwidth associated with the second network element, and
   sending, by the network equipment, message data representative of a message to the third network element that the resource is to be obtained from the second network element.

2. The method of claim 1, wherein the receiving the state data is in response to the first network element publishing the state data related to the first network element.

3. The method of claim 2, wherein the state data comprises location data indicative of a location associated with the first network element.

4. The method of claim 2, wherein the state data comprises session data related to a session associated with the first network element.

5. The method of claim 1, further comprising:
receiving, from the second network element, by the network equipment, the second request to subscribe to the state data of the first network element.

6. The method of claim 1, wherein the first network element is connected to a software-defined networking interface.

7. The method of claim 6, wherein the state data comprises error code data related to a potential error code.

8. A system for network equipment, comprising:
a processor; and
a memory that stores executable instructions that, when executed by the processor, facilitate performance of operations, comprising:
   receiving state data related to a state of a first network element;
   registering the state data resulting in registration of the first network element;
   in response to the registering, generating policy data associated with a policy related to access of a resource of the first network;
   in response to a first request for the resource by a second network element, sending the state data to the second network element in accordance with the policy;
   based on the policy data, flagging the resource, wherein the flagging comprises generating an indication that the resource is to be received from a third network element based on an anticipated state of the first network element, and wherein being permitted to perform flagging of the resource is a content modification privilege that is specific to the network equipment; and
   in response to a second request for the resource by the third network element:
      preventing access to the state data by the third network element to preserve a bandwidth associated with the second network element, and
      sending message data representative of a message to the third network element that the resource is to be obtained from the second network element.

9. The system at claim 8, wherein the state data is first state data, wherein the resource is a first resource, and wherein the operations further comprise:
publishing second state data associated with a second resource, wherein the second resource is an Internet protocol address of the second network element.

10. The system of claim 9, wherein the first state data comprises location data associated with a location of the second resource.

11. The system of claim 9, wherein the first state data comprises utilization data associated with a usage of the second resource.

12. The system of claim 8, wherein the operations further comprise: registering the second network element, wherein the second network element is associated with state data.

13. The system of claim 8, wherein the operations further comprise: caching the state data, at a service controller, associated with the second network element.

14. The system of claim 13, wherein the service controller comprises a software-defined networking interface.

15. A non-transitory machine-readable medium, comprising executable instructions that, when executed by a processor associated with network equipment, facilitate performance of operations, comprising:
   receiving state data related to a state of a first network element;
   in response to the receiving, registering the state data, resulting in registration of the first network element;
   based on the registering, generating policy data associated with a policy related to access of a resource of the first network element;
   in response to a first request for the resource by a second network element, sending the state data to the second network element in accordance with the policy;
   in response to the generating the policy data, generating a first indication that the resource is to be received from a third network element;
   based on the policy data, flagging the resource, wherein the flagging comprises generating a second indication that the resource is to be received from the third network element based on an anticipated state of the first network element, and wherein being permitted to perform flagging of the resource is a content modification privilege that is specific to the network equipment; and
   in response to a second request for the resource by the third network element:
      blocking access to the state data by the third network element to preserve a bandwidth associated with the second network element, and
      transmitting message data, representative of a message, to the third network element that the resource is to be acquired from the second network element.

16. The non-transitory machine-readable medium of claim 15, wherein the operations further comprise:
publishing the state data associated with the first network element for review by the second network element.

17. The non-transitory machine-readable medium of claim 15, wherein the operations further comprise:
sending time-to-live data associated with a time that the resource of the first network element is available.

18. The non-transitory machine-readable medium of claim 15, wherein the operations further comprise:
in response to a policy change via a service controller, receiving updated data related to the second network element.

19. The non-transitory machine-readable medium of claim 18, wherein the service controller comprises a network element virtualization interface.

20. The non-transitory machine-readable medium of claim 15, wherein the operations further comprise:
   sending agent identification data via an agent associated with the first network element.

\* \* \* \* \*